United States Patent [19]

Sturgis et al.

[11] Patent Number: 4,799,530

[45] Date of Patent: Jan. 24, 1989

[54] METHOD FOR RECOVERING CASTING REFRACTORY COMPOSITIONS FROM INVESTMENT CASTING SLURRIES

[75] Inventors: David H. Sturgis, Gladstone; William W. Kemp, Milwaukie, both of Oreg.

[73] Assignee: Precision Castparts Corp., Portland, Oreg.

[21] Appl. No.: 153,063

[22] Filed: Feb. 8, 1988

[51] Int. Cl.$^4$ .................. B02C 23/20; C01F 17/00
[52] U.S. Cl. ........................... 164/5; 423/21.1
[58] Field of Search ................ 164/5; 423/21.1, 263

[56] References Cited

U.S. PATENT DOCUMENTS 4,650,652 3/1987 Naitou et al. .................. 423/263
4,703,806 11/1987 Lassow et al. .................. 154/518

FOREIGN PATENT DOCUMENTS 61-26513 2/1986 Japan .................. 423/263
61-47779 3/1986 Japan .................. 423/21.1
530731 5/1975 U.S.S.R. .................. 322/164
856645 8/1981 U.S.S.R. .................. 164/5

OTHER PUBLICATIONS

Feagin, R. C., "Casting of Reactive Metals Into Ceramic Molds" Sixth World Conference on Investment Casting (date unknown).
"Developement of Titanium Alloy Casting Technology", Airsearch Manufacturing Company of Arizonia, Aug. 1976.
Searle, Alfred B., "Refractory Materials: Their Manufacture and Uses", Charles Griffin & Co., Ltd., London, England, p. 122 (1917).
Searle, Alfred B., "Refractory Materials: Their Manufacture and Uses", Charles Griffin & Co., London, England, 2nd Ed., pp. 194–196 (1924).
Norton, F. H., "Refractories", McGraw-Hill Book Company, Inc., 3rd Ed., pp. 302–339 (1949).
Calvert, E. D., "An Investment Mold for Titanium Casting", Bureau of Mines Report of Investigation No. 8541 (1981).
Helferich, R. L. et al., "An Investigation of Yttrium Oxide as a Crucible Material for Melting Titanium", Dept. of Navy, Naval Ship Research & Development Center, Jan. 1973, Report 3911.
"Third Interim Technical Report Development of Titanium Alloy Casting Technology" Airesearch Mfg. Co. of AZ., Jan. 1975.

Primary Examiner—Kuang Y. Lin
Attorney, Agent, or Firm—Klarquist, Sparkman, Campbell, Leigh & Whinston

[57] ABSTRACT

A highly efficient method for recovering $Y_2O_3$ from casting slurries and cores containing $Y_2O_3$ in combination with a binder is disclosed. The slurry is first treated with a gelling agent which causes the slurry to gel. The gelled slurry is then ignited in order to remove residual organic compounds. After ignition, the product is crushed and pulverized to form a powder. Thereafter, the powder is calcined at a temperature sufficient to crystallize the silica binder in the powder. The calcined product is subsequently dissolved in a heated acid solution for a selected time period. The resulting solution contains dissolved $Y_2O_3$ and undissolved binder residue, which is filtered and removed. The $Y_2O_3$ in the solution is then diluted with deionized water, and precipitated, preferably using oxalic acid to produce yttrium oxalate. The yttrium oxalate is ultimately removed from the solution and calcined to produce high purity $Y_2O_3$. Cores are processed in a similar manner.

30 Claims, 1 Drawing Sheet

METHOD FOR RECOVERING CASTING REFRACTORY COMPOSITIONS FROM INVESTMENT CASTING SLURRIES

BACKGROUND OF THE INVENTION

The present invention generally relates to the chemical treatment of casting slurries and cores, and more particularly to the recovery of $Y_2O_3$, from investment casting slurries and investment casting cores.

Yttrium oxide ($Y_2O_3$) is an important and useful metal casting refractory. It is thermodynamically stable in the presence of most reactive engineering metals including titanium, titanium alloys, and columbium (niobium). General information regarding $Y_2O_3$ metal casting processes is presented in Feagin, R. C., "Casting of Reactive Metals into Ceramic Molds", Report of Sixth World Conference on Investment Casting, pp. 4:01–4:13, 1984; and Calvert, E. D., "An Investment Mold For Titanium Casting", United States Department of the Interior (Bureau of Mines), Report of Investigations No. 8541, 1981.

The use of $Y_2O_3$ as a refractory material in both investment and core casting processes normally involves the production of a slurry containing both $Y_2O_3$ and a hydrolyzed binder. An example of such a slurry is described in U.S. Pat. No. 4,703,806, of Lassow, et al. Most often, silica binders are used, such as tetraethyl ortho silicate. Once the casting process is completed, the slurry is usually discarded. However, this is undesirable for both financial and environmental reasons. Recycling of the slurry to reclaim $Y_2O_3$ would offer a significant cost savings, and eliminate disposal problems.

The present invention involves a method whereby $Y_2O_3$ can be reclaimed from used casting slurries and cores which contain $Y_2O_3$ in combination with a binder. The method is highly efficient, and results in the recovery of up to 90% or more of the $Y_2O_3$ originally contained in the slurry. Also, the recovered $Y_2O_3$ has a purity level of nearly 100%. This is accomplished using a minimal number of process steps, as described in detail below.

SUMMARY OF THE INVENTION

It is an object of the present invention to provide an efficient method for recovering $Y_2O_3$ from investment casting slurries and cores.

It is another object of the invention to provide a method for recovering $Y_2O_3$ from investment casting slurries and cores capable of producing a high percentage yield of $Y_2O_3$.

It is another object of the invention to provide a method for recovering $Y_2O_3$ from investment casting slurries and cores which yields a $Y_2O_3$ product of nearly 100% purity.

It is another object of the invention to provide a method for recovering $Y_2O_3$ from investment casting slurries and cores which uses a minimal number of process steps.

It is a further object of the invention to provide a method for recovering $Y_2O_3$ from investment casting slurries and cores which enables a nearly complete separation of binder materials from $Y_2O_3$.

It is a still further object of the invention to provide a method for recovering $Y_2O_3$ from investment casting slurries and cores which is especially well suited to large scale casting operations.

In accordance with the foregoing objects, a highly efficient method for recovering $Y_2O_3$ from casting slurries containing $Y_2O_3$ in combination with a silica binder is disclosed. The used slurry is initially treated with a gelling agent which causes the slurry to gel. The gelled slurry is then ignited to remove any residual organic compounds. After ignition, the product is crushed and pulverized to form a powder. Thereafter, the powder is calcined at a temperature sufficient to crystallize the silica binder in the powder. The calcined product is subsequently dissolved in heated acid for a selected time period. The resulting solution contains dissolved $Y_2O_3$ and undissolved silica binder, which is filtered and removed. The $Y_2O_3$ in the solution is then precipitated, preferably using oxalic acid to produce yttrium oxalate [$Y_2(C_2O_4)_3 \cdot 9H_2O$]. The $Y_2(C_2O_4)_3 \cdot 9H_2O$ is ultimately removed from the solution and calcined to produce high purity $Y_2O_3$. A similar process is disclosed for recovering $Y_2O_3$ from casting cores.

These and other objects, features and advantages of the invention shall be described in greater detail below in the following detailed description of a preferred embodiment, example, and drawing.

DETAILED DESCRIPTION OF A PREFERRED EMBODIMENT

Figure 1:
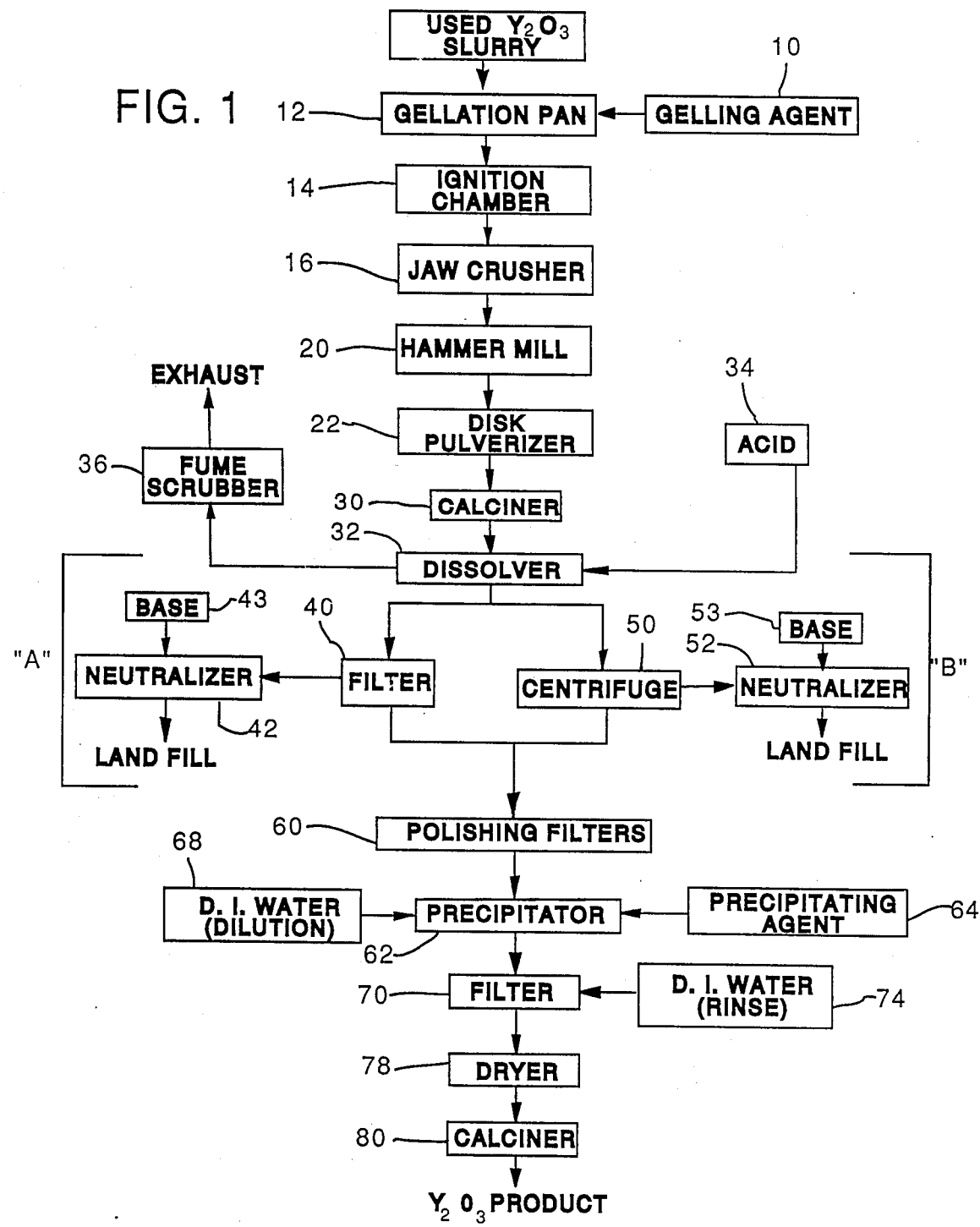
FIG. 1 is a schematic representation of the process steps used in conjunction with the present invention to recover $Y_2O_3$ from an investment casting slurry.

The present invention includes a highly effective and efficient method for recovering $Y_2O_3$ from investment casting slurries containing both $Y_2O_3$ and a binder.

The binders typically used in such slurries are those known in the art, including hydrolyzed ethyl silica or colloidal silica binders, and particularly tetraethyl ortho silicate. This latter material is commonly sold under the trade name Ethyl Silicate 40, which contains 40% $SiO_2$ and is available from the Stauffer Chemical Company of Stamford, Connecticut. Other exemplary binders include colloidal alumina and colloidal zirconia.

It is desirable from both a cost and environmental standpoint to reclaim the $Y_2O_3$ in the slurries for re-use at a later date.

To accomplish this, a slurry is first treated to form a solid mass. With reference to FIG. 1, this is preferably accomplished by initially reacting the slurry with a gelling agent 10. The gelling agent 10 raises the slurry pH, causing the binder to gel. Compounds suitable for this purpose include ammonia, dibutylamine, and morpholine (tetrahydro-p-oxazine). Since the amount of gelling agent 10 depends on various factors including slurry composition, quantity and age, visual inspection of the slurry during addition of the gelling agent will be most effective in determining when gellation is occurring, and how much gelling agent to use. However, a sufficient amount of gelling agent should be added in order to cause gellation within about 15 minutes to 1 hour.

Upon mixing the gelling agent 10 into the slurry, the gellation reaction occurs spontaneously, and a visual inspection of the slurry will indicate when gellation is completed. As shown in FIG. 1, the gelling agent 10 and slurry are combined in a gellation pan 12 which typically consists of a conventional stainless steel tray or similar apparatus.

After the completion of gellation, the gelled slurry is ignited in a furnace or vented ignition chamber 14. The gel will burn because it contains various amounts of volatile organic compounds, including ethanol which is a by-product produced during hydrolysis of the binder. It may be necessary to mix, stir, or puncture the gelled slurry mass to ensure complete ignition. Combustion removes nearly all residual organic materials in the gelled slurry. For example, silica binder materials burn, leaving a silica-containing residue. The gel is allowed to continue burning until all of the combustible organic compounds are gone. At that point, the gel will stop burning.

Next, the burned material is introduced into a jaw crusher 16, followed by the optional use of a hammer mill 20. Use of the hammer mill 20 depends on the volume of material to be treated along with other production parameters. The hammer mill 20 is most likely to be used in large scale processing operations involving substantial quantities of the burned material.

Thereafter, the product is pulverized in a disk pulverizer 22. As a result, a powder is produced having a particle size not exceeding about 100 mesh. The process works with coarser particles although it takes longer.

The powdered product is then calcined in a calciner 30 at a temperature of between 1,500° and 2,000° F. for a time period sufficient to crystallize binder residue in the powdered product. Typically not less than about 2.0 hours is required to crystallize a silica binder. Crystallization facilitates subsequent filtration and removal of the binder residue, as described below.

Calcination traditionally involves the heating of a material at a high temperature without fusion in order to effect physical and chemical changes in the material. In the present invention, the calciner 30 typically consists of a ceramic container otherwise known as a "sagger" box which is filled with the powder and placed in a kiln for firing.

After treatment in the calciner 30, the calcined product is introduced into a dissolver unit 32. A typical dissolver unit 32 would include a jacketed tank in association with an agitator system. Added to the product within the dissolver unit 32 is at least one acid 34 heated to a temperature of about 150°–210° F. The acid is selected for its ability to dissolve $Y_2O_3$ without significantly dissolving binder residue. Exemplary acids, suitable for use with silica binders, include nitric or hydrochloric acid solutions (with nitric being preferred) having a normality ranging from about 6.0 to 15.0.

The time required for dissolving the calcined product in the dissolver unit 32 is approximately 4–6 hours. Between about 0.5 and 1.5 pounds of calcined product are preferably used per gallon of acid. In a preferred form of the invention, acidic vapors are routed from the dissolver unit 32 through a fume scrubber 36 of conventional design prior to release.

At this stage in the process, a solution is produced which contains dissolved $Y_2O_3$ and undissolved binder residue. The solution is then cooled to room temperature (approximately 70° F.), followed by removal of the undissolved binder residue which may be accomplished in two ways. Using procedure "A" as shown in FIG. 1, the solution is first introduced into a filter 40 preferably of the standard vacuum pan variety. The collected binder residue is then treated with a basic material 43 (e.g. NaOH, KOH, or $Na_2CO_3$) in a neutralizer tank 42. The resulting non-toxic, neutralized compound may then be suitably disposed of in a landfill or other waste storage area.

In procedure "B", the solution containing undissolved binder residue is introduced into a conventional centrifuge 50, with the collected silica binder being passed into a neutralizer tank 52 of the same type as neutralizer tank 42 wherein binder residue is treated with a basic material 53 comparable to those listed above.

The binder-free solution from subprocess "A" or "B" is then passed into at least one polishing filter 60 which consists of any conventional filter unit or filter media capable of removing particulates as small as 0.2 micron. After filtering, the solution is diluted and precipitated in a precipitator tank 62. In the precipitator tank 62, a temperature of about 70° F.–150° F. (preferred=about 115° F.) is maintained simultaneously with the addition of a precipitating agent 64. The precipitating agent 64 most suitable for use in the invention consists of oxalic acid. The oxalic acid may be added in either crystal form (dihydrate) or as a solution. For example, a 9% solution of oxalic acid in water will effectively work in the precipitator tank 62.

However, prior to the addition of the precipitating agent 64, deionized water 68 is added to the solution. The deionized water 68 is designed to dilute the solution in the precipitator tank 62. Dilution enables the amount of precipitating agent 64 needed for $Y_2O_3$ recovery to be decreased. The deionized water should be added to the solution in a water : solution volume ratio ranging from about 1:1 to 8:1 depending on the concentration of the acid in the solution. For example, 3 gallons of deionized water would preferably be added to 1 gallon of solution containing 1 pound of $Y_2O_3$.

When oxalic acid is used in the precipitator tank 62, yttrium oxalate $[Y_2(C_2O_4)_3 \cdot 9H_2O]$ is formed as a solid precipitate. This precipitate is then introduced into a filter 70, preferably of the vacuum pan type as described above, to separate the precipitate from remaining liquid.

After filtration, deionized water 74 is passed through the filter cake in an amount sufficient to wash away any soluble impurities in the $Y_2(C_2O_4)_3 \cdot 9H_2O$. The collected $Y_2(C_2O_4)_3 \cdot 9H_2O$ is then dried in a dryer 78 preferably consisting of a conventional convection oven at a temperature of about 150° F., or whatever is necessary to remove any remaining moisture. After drying, the $Y_2(C_2O_4)_3 \cdot 9H_2O$ is calcined in a calciner 80 of the same type as calciner 30 at a temperature of at least 1500° F. for about 2 hours to remove all of the waters of hydration associated with $Y_2(C_2O_4)_3 \cdot 9H_2O$. The resulting product consists of highly pure $Y_2O_3$ which may be used again in the preparation of investment casting slurries.

Use of the foregoing process is beneficial from both a cost and environmental standpoint. It enables complete removal of the binder in order to attain a recovered $Y_2O_3$ product having nearly 100% (99.9%) purity. In addition, recovery yields of up to 90% $Y_2O_3$ or more with respect to the amount of $Y_2O_3$ in the initial slurry are obtainable.

EXAMPLE

In accordance with the present invention, a slurry sample was prepared, used as a casting refractory, and treated to recover $Y_2O_3$. The slurry contained the following ingredients:

| Component | Weight Percent of Composition |
| --- | --- |
| $Y_2O_3$ flour | 88.0 |
| silica-containing binder | 12.0 |
| (hydrolyzed ethyl silicate containing 12% $SiO_2$) | |
| | 100.0% |

The process is not limited to the recovery of $Y_2O_3$ from this specific type of slurry.

To recover $Y_2O_3$, the slurry was first gelled for about 15 minutes in a stainless steel gellation pan using a solution having a 1:1 volume ratio of ethanol and dibutylamine. Approximately 3 ml of this solution was used per 2 pounds of slurry. After gellation, the slurry was ignited in an oven and allowed to burn until the residual organic materials therein were gone (about 4 hours). Next, the solid product was crushed and pulverized to a powder having an approximate particle size of 100 mesh. This product was then calcined at a temperature of 1800° F. for two hours in a kiln. Fifty pounds of the calcined product were subsequently mixed with fifty gallons of 9N nitric acid at a temperature of 170° F. for about 6 hours to form a solution. The resulting solution was then cooled and vacuum filtered to remove the residual silica binder. After filtration, the solution was diluted with approximately 150 gallons of deionized water, followed by precipitation of the $Y_2O_3$ with 100 pounds of oxalic acid crystals. The precipitated $Y_2(C_2O_4)_3 \cdot 9H_2O$ was removed from the solution, dried, and calcined in a kiln at 1,000° C. for 2 hours. The resulting $Y_2O_3$ had a purity of 99.9%. In addition, the percentage yield of $Y_2O_3$ was approximately 91–94%.

The foregoing method may also be used to recover $Y_2O_3$ from solid $Y_2O_3$ preformed cores produced through injection molding, transfer molding and other conventional techniques. A typical $Y_2O_3$ core would be formed using the $Y_2O_3$ flour described above (see Example) in combination with an aqueous or non-aqueous binder known in the art (e.g. tetraethyl ortho silicate) to produce a mixture suitable for molding. The mixture would preferably consist of about 80–90% $Y_2O_3$ flour and about 10–20% binder. To recover $Y_2O_3$ from a solid $Y_2O_3$ core, the core is first removed from the casting by conventional mechanical and/or chemical means. Preferably, water blasting may be used, followed by chemical leaching of the casting materials with an acid such as $HNO_3$.

Removal of the core results in the production of large pieces or chunks of core which are dried in an oven and pulverized using conventional pulverizing machinery to form a powder having a particle size not exceeding 100 mesh. Thereafter, the powder is treated in the same manner as described above with respect to the slurry materials.

The key differences in treating used $Y_2O_3$ core materials as compared with the treatment of $Y_2O_3$ slurries involves elimination of the gellation and ignition steps. Gellation is not required because the $Y_2O_3$ core materials are already in solid form. Ignition is not required because firing of the core will have eliminated all residual organic materials which may have been present in the core. In addition, calcination of the powdered product may not be necessary if it is determined that residual organic materials are not present therein.

The foregoing procedure may also be used in recovering $Y_2O_3$ from cores which have not been used in casting processes but are defective for one reason or another and must be destroyed. The process steps are the same as described above for used $Y_2O_3$ core materials, except that ignition of the core materials prior to pulverization would be done in order to remove residual organic materials if such materials were determined to be present.

Finally, if acid leaching is used in the initial stages of core removal, the used acid solution will retain some residual $Y_2O_3$. To recover the $Y_2O_3$, the acid solution is passed through the polishing filter 60 in FIG. 1, and added to the solution already in precipitator 62 followed by the treatment procedure described above.

Having herein described a preferred embodiment of the invention, it is anticipated that suitable modifications may be made by those skilled in the art within the scope of the invention. Accordingly, the present invention shall be construed only in accordance with the following claims.

What is claimed is:

1. A process for the recovery of $Y_2O_3$ from a used investment casting slurry having $Y_2O_3$ in combination with a binder, said process comprising:
   forming a solid mass from said slurry;
   pulverizing said mass to form a powder;
   forming a solution from said powder, said solution having yttrium dissolved therein, with said binder remaining undissolved,
   separating said binder from said solution; and
   removing yttrium from said solution after said separating of said binder.

2. The process of claim 1 wherein said forming of said solid mass from said slurry comprises the steps of:
   gelling said slurry through the addition of at least one gelling agent; and
   igniting said slurry after said gelling.

3. The process of claim 1 wherein said powder formed from said mass is calcined in order to crystallize said binder therein.

4. The process of claim 1 wherein said solution is formed from said powder by contacting said powder with at least one acid.

5. The process of claim 1 wherein said separating comprises the steps of:
   adding a precipitating agent to said solution in order to form a yttrium precipitate;
   removing said yttrium precipitate from remaining liquid; and
   calcining said removed yttrium precipitate in order to produce a high purity $Y_2O_3$ product.

6. The process of claim 5 wherein said precipitating agent comprises oxalic acid.

7. A process for the recovery of $Y_2O_3$ from a used investment casting slurry having $Y_2O_3$ in combination with a binder, said process comprising:
   treating said used slurry with at least one gelling agent to form a gel;
   igniting said gel to burn off residual organic compounds therein, leaving a burned material which contains $Y_2O_3$ and a binder residue;
   pulverizing said burned material to produce a powder;
   calcining said powder to crystallize said binder residue therein;
   contacting said powder, after said calcining, with at least one acid suitable to dissolve $Y_2O_3$ and thereby produce a yttrium solution without substantially dissolving crystallized binder residue;

separating said crystallized binder residue from said solution; and removing yttrium from said solution after said separating of said crystallized binder residue.

8. The process of claim 7 wherein said gelling agent is selected from the group consisting of ammonia, dibutylamine, and morpholine.

9. The process of claim 7 wherein said slurry after said igniting is pulverized to form a powder having a particle size not exceeding about 100 mesh.

10. The process of claim 7 wherein said powder is calcined at a temperature of about 1,500°-2,000° F.

11. The process of claim 7 wherein said acid used to dissolve $Y_2O_3$ is selected from the group consisting of nitric acid and hydrochloric acid.

12. The process of claim 7 wherein said acid has a normality of about 6.0-15.0.

13. The process of claim 7 wherein said contacting involves the use of about 0.5-1.5 pounds of said powder per gallon of said acid.

14. The process of claim 7 wherein $Y_2O_3$ is dissolved from said powder over a time period of about 4-6 hours.

15. The process of claim 7 wherein said acid is heated to about 150°-210° F.

16. The process of claim 7 wherein said separating of said crystallized binder residue from said solution comprises the steps of cooling said solution and crystallized binder residue, followed by filtration to isolate said crystallized binder residue from said solution.

17. The process of claim 7 wherein said removing yttrium comprises the steps of:

adding a precipitating agent to said solution in order to form a yttrium precipitate;

removing said yttrium precipitate from remaining liquid; and calcining said removed yttrium precipitate in order to produce a high purity $Y_2O_3$ product.

18. The process of claim 17 wherein said solution is diluted with water prior to said adding of said precipitating agent.

19. The process of claim 17 wherein said precipitating agent comprises oxalic acid.

20. A process for the recovery of $Y_2O_3$ from a used investment casting slurry having $Y_2O_3$ in combination with a binder, said process comprising:

treating said used slurry with at least one gelling agent to form a gel;

igniting said gel to burn off residual organic compounds therein, leaving a burned material which contains $Y_2O_3$ and a binder residue;

pulverizing said burned material to produce a powder;

calcining said powder at a temperature of about 1,500°-2,000° F. to crystallize said binder residue therein;

contacting said powder, after said calcining, with at least one heated acid for a time period of about 4-6 hours, said acid having a normality of about 6.0-15.0 and being suitable to dissolve $Y_2O_3$ to produce a yttrium solution without substantially dissolving crystallized binder residue;

separating said crystallized binder residue from said solution; and removing yttrium from said solution after said separating of said crystallized binder residue.

21. The process of claim 20 wherein said slurry after said igniting is pulverized to form a powder having a particle size not exceeding about 100 mesh.

22. The process of claim 20 wherein said gelling agent is selected from the group consisting of ammonia, dibutylamine, and morpholine.

23. The process of claim 20 wherein said acid used to dissolve $Y_2O_3$ is selected from the group consisting of nitric acid and hydrochloric acid.

24. The process of claim 20 wherein said contacting involves the use of about 0.5-1.5 pounds of said powder per gallon of said acid.

25. The process of claim 20 wherein said acid is heated to about 150°-210° F.

26. The process of claim 20 wherein said separating of said crystallized binder residue from said solution comprises the steps of cooling said solution and crystallized binder residue, followed by filtration of said solution to isolate said crystallized binder residue therefrom.

27. The process of claim 20 wherein said separating comprises the steps of:

adding a precipitating agent to said solution in order to form an yttrium precipitate;

removing said yttrium precipitate from said remaining liquid; and calcining said removed yttrium precipitate in order to produce a high purity $Y_2O_3$ product.

28. The process of claim 27 wherein said solution is diluted with water prior to said adding of said precipitating agent.

29. The process of claim 27 wherein said precipitating agent comprises oxalic acid.

30. A process for the recovery of $Y_2O_3$ from a used investment casting slurry having $Y_2O_3$ in combination with a silica binder, said process comprising:

treating said slurry with at least one gelling agent selected from the group consisting of ammonia, dibutylamine and morpholine to form a gel;

igniting said gel to burn off residual organic compounds therein, leaving a burned material which contains $Y_2O_3$ and a binder residue;

pulverizing said burned material to produce a powder having a particle size not exceeding about 100 mesh;

calcining said powder at a temperature of about 1,500°-2,000° F. to crystallize said silica binder residue therein;

contacting said powder, after said calcining, with at least one acid selected from the group consisting of nitric acid and hydrochloric acid to dissolve $Y_2O_3$ and thereby produce a yttrium solution without substantially dissolving crystallized silica binder residue, said acid having a temperature of about 150°-210° F. and a normality of about 6.0-15.0, with about 0.5-1.5 pounds of said powder being used per gallon of said acid; said contacting of said powder being done over a time period of about 4-6 hours;

cooling said solution and crystallized silica binder residue;

filtering said solution after said cooling in order to separate said crystallized silica binder residue therefrom;

diluting said solution with water after said filtering;

adding oxalic acid to said solution after said diluting with said water in order to form a yttrium oxalate precipitate;

removing said yttrium oxalate precipitate from said remaining liquid; and calcining said removed yttrium oxalate precipitate in order to produce a pure $Y_2O_3$ product.

* * * * *